(12) United States Patent
Guldenfels

(10) Patent No.: US 6,766,899 B1
(45) Date of Patent: Jul. 27, 2004

(54) SPROCKET WITH COMBINED HINGE/CENTER DRIVE

(75) Inventor: Dieter Guldenfels, Pfeffingen (CH)

(73) Assignee: Habasit AG, Reinach (CH)

(*) Notice: Subject to any disclaimer, the term of this patent is extended or adjusted under 35 U.S.C. 154(b) by 308 days.

(21) Appl. No.: 09/751,513

(22) Filed: Dec. 29, 2000

(51) Int. Cl.⁷ .............................................. B65G 23/04
(52) U.S. Cl. .................................................... 198/834
(58) Field of Search ......................... 198/834, 851–853

(56) References Cited

U.S. PATENT DOCUMENTS 5,921,379 A * 7/1999 Horton ..................... 198/852
6,330,941 B1 * 12/2001 Guldenfels .............. 198/853

* cited by examiner

Primary Examiner—Joseph E. Valenza
(74) Attorney, Agent, or Firm—Hodgson Russ LLP

(57) ABSTRACT

A conveying apparatus comprising a modular belt having a plurality of modules connected to adjacent modules and articulated by pivot rods that extend through openings in the link ends of the modules. The openings extend transverse to the direction of belt travel. The apparatus also includes a drive sprocket having a plurality of teeth disposed about the circumference of the wheel. Each tooth has a center driving surface and a link end driving surface. The teeth are disposed such that each belt module may be driven in either direction from the center by one of the teeth and simultaneously driven at a link end by one of the other teeth such that there is positive engagement with each belt module by two teeth. It is emphasized that this abstract is provided to comply with the rules requiring an abstract that will allow a searcher or other reader to quickly ascertain the subject matter of the technical disclosure. It is submitted with the understanding that it will not be used to limit the scope or meaning of the claims. 37 C.F.R. 1.72(b).

10 Claims, 5 Drawing Sheets

SPROCKET WITH COMBINED HINGE/ CENTER DRIVE

FIELD OF INVENTION

The present invention relates to modular conveying apparatus.

BRIEF DESCRIPTION OF THE DRAWINGS

The invention is illustrated in the drawings in which like reference characters designate the same or similar parts throughout the figures of which.

DETAILED DESCRIPTION

Figure 1:
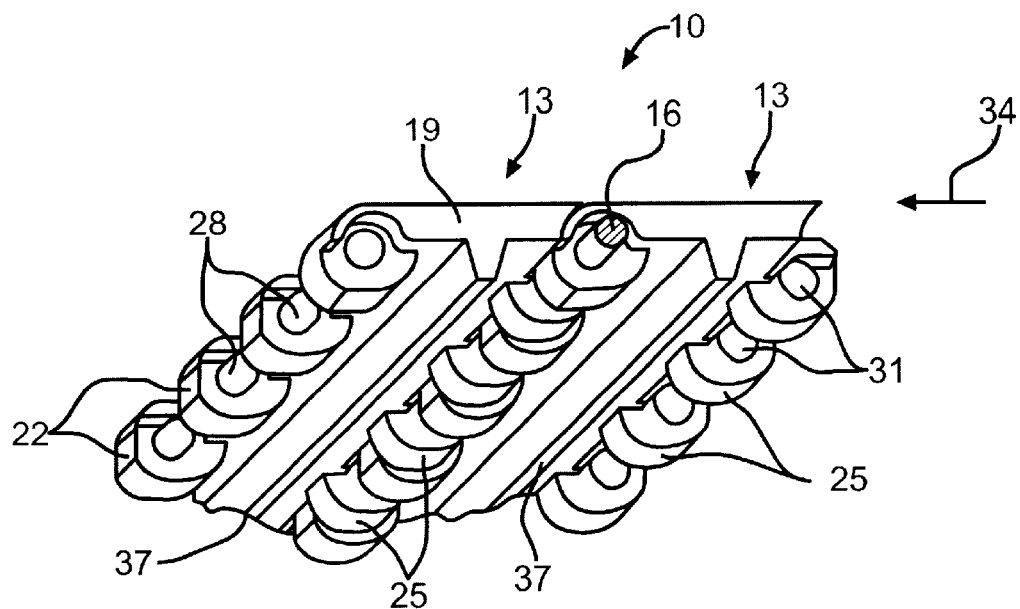
FIG. 1 is a perspective view, obliquely from beneath, of two belt modules connected by a pivot rod.
Figure 4:
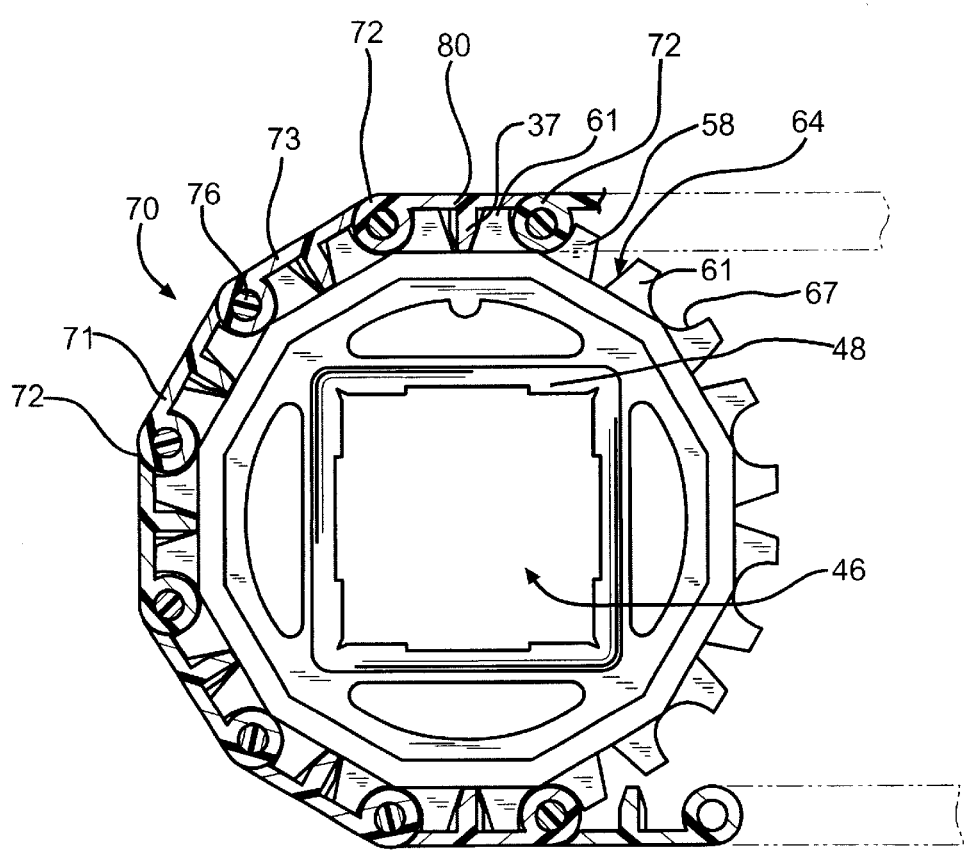
FIG. 4 is a sectional side elevational view of a flat top belt engaged with the sprocket.
Figure 5:
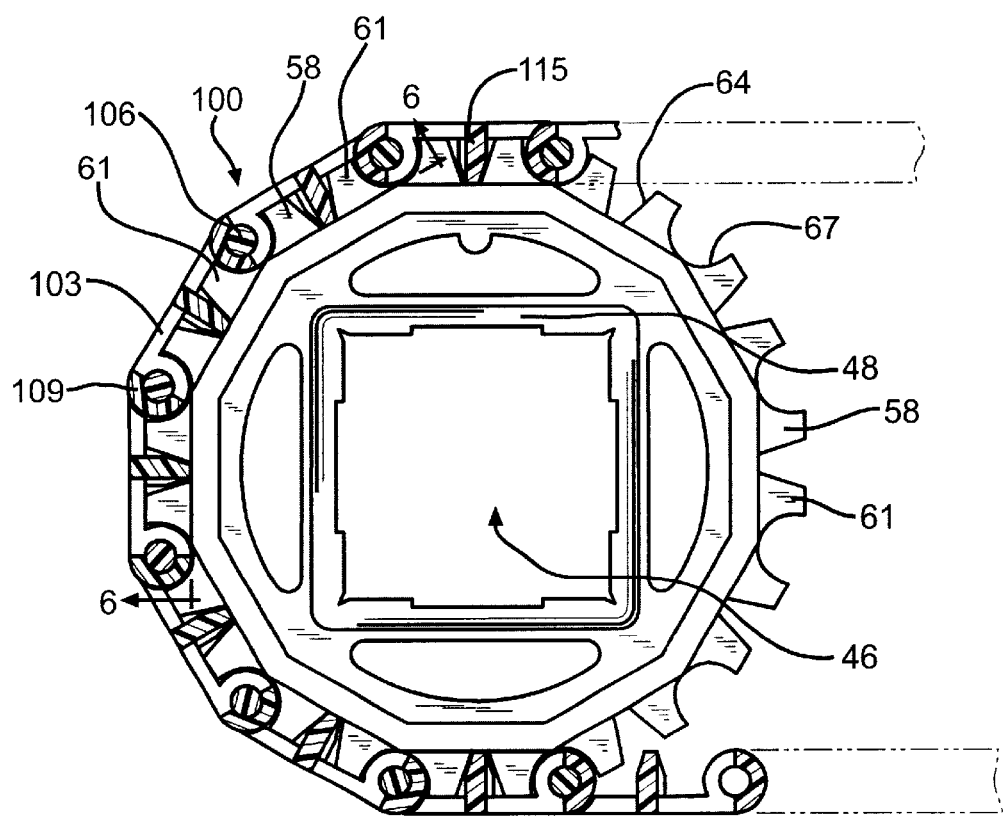
FIG. 5 is a sectional side elevational view of an open grid belt engaged with the sprocket; and, FIG. 6 is a sectional view taken along lines 6—6 of FIG. 5.

Referring to FIG. 1, a flat top modular conveying belt 10 is shown with two interengaging belt modules 13 which are articulated on one another by a pivot rod 16. Each belt module 13 has a module body 19, a first and second series of link ends 22, 25 that project from two opposite sides of the module body 19. Each link end 22, 25 includes an opening 28, 31 that is disposed transverse to the direction of belt travel indicated by arrow 34. The belt 10 may be driven in either direction. A transverse rib 37 is also disposed transverse to the direction of belt travel. The openings 28 and 31 as shown comprise slots that are arranged at angles of approximately 45o to the conveying surface. For straight running belts, round openings are also suitable as shown in FIGS. 4 and 5.

The link ends 22, 25 are considerably wider in their top part than in their bottom part, which has the opening 28, 31 with the result that adjacent link ends 22, 25 of interengaging modules 13 adjoin one another in a virtually gap-free manner in the top region. Moreover, the top side of the modules 13 is of flat design (FIGS. 1 and 4), which results in a planar, essentially continuous conveying surface.

The transverse ribs 37 extend downward from the underside of the module bodies 19, in the center of the bodies 19, and have a symmetrical, in this case trapezoidal cross section with the result that the modular conveying belt 10 can be moved just as easily forwards as backwards, perpendicularly to the transverse ribs 37.

Figure 2:
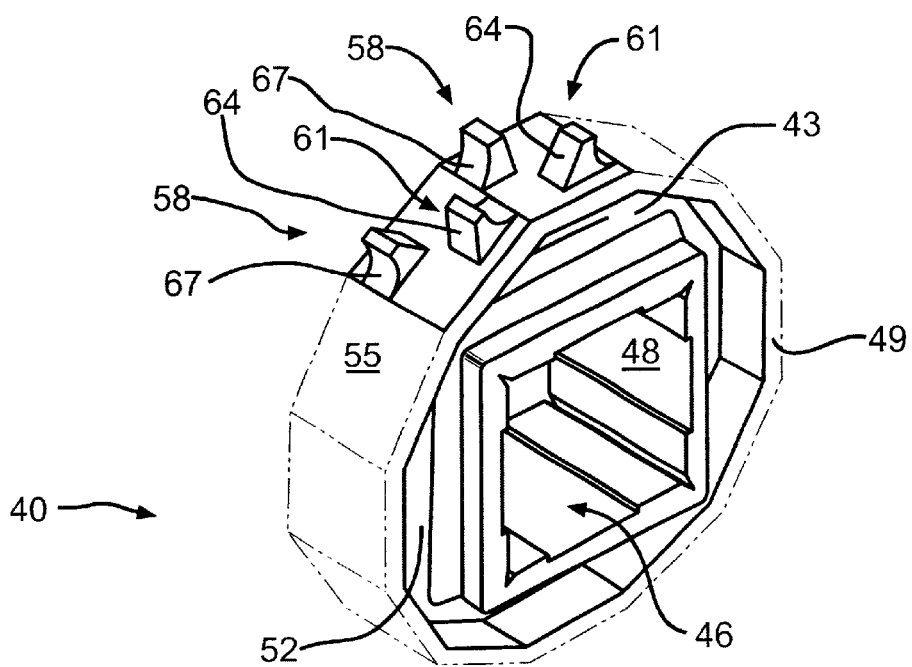
FIG. 2 is a partial perspective view of the sprocket of the present invention.
Figure 3:
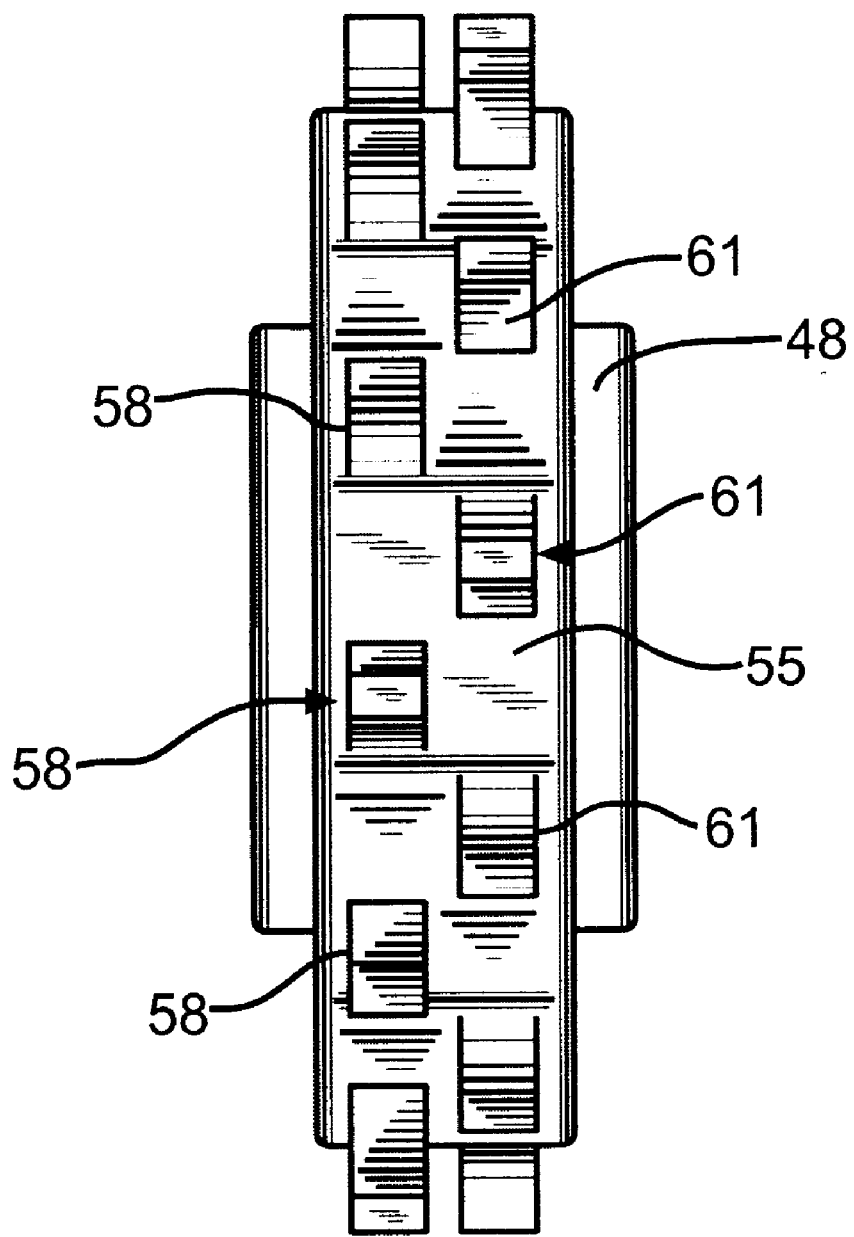
FIG. 3 is an end elevational view of the sprocket of the present invention.

Referring to FIGS. 2–3, the drive sprocket 40 illustrated comprises a twelve-sided wheel body 43 with an essentially square opening 46 formed by four opposed walls 48. The opening 46 provides for mounting the drive sprocket 40 onto a drive shaft. While the opening 46 is shown with a square shape, other shapes to accommodate other shapes for the drive shaft would also be suitable. Also, although the drive sprocket 40 is shown with a twelve-sided outer body the wheel 40 may have more or less sides or may even be round. The wheel body 43 is of considerably wider design in an outer region 49 than in an inner region 52, and on its outer circumference, forms twelve planar surfaces 55 on which two teeth 58, 61 are arranged in each case. The two teeth 58, 61 arranged on a surface 55 are each of the same shape, but have been rotated 180° with respect to one another. The ends of the two teeth 58, 61 that are directed away from one another in the direction of rotation of the drive sprocket 40 each extend as far as the border of the planar surface 55.

The teeth 58, 61 are distributed in two series over the circumference of the drive sprocket 40 such that during driving of the modular conveying belt 10, one of the teeth 58, 61 on one of the surfaces 55 engages with one of the link ends 22,.25 and another tooth 58, 61 on an adjacent surface 55 engages with the transverse rib. 37. Each tooth 58, 61 has a center driving face 64 and a link end driving face 67. The teeth 58, 61 are disposed in offset pairs on each surface 55 such that the modular belt 10 can be driven in either direction.

In FIG. 4, a flat top belt 70 is shown in a cutaway view as it engages with the drive sprocket 40. In order to drive the modular conveying belt 70, which comprises a multiplicity of modules 73 articulated on one another by means of pivot rods 76, use is typically made of a plurality of drive sprockets 40 spaced apart from one another on a shaft. The modules 73 have opposed link ends 72 and 75 (located behind the link end 72 shown) disposed at opposite ends of module body 71. For clarity, only one drive sprocket 40 being visible here. Each transverse rib 37 is driven by a center driving surface 64 on one surface 55 and a link end driving surface 67 on an adjacent surface 55 engaging with one of the link ends 72, 75. The drive sprocket 40 engages the modules such that each module is engaged by two teeth. One of the teeth is in one pair and the other tooth is in an adjacent pair. For example, with respect to counterclockwise rotation of sprocket 40, module 80 is engaged by tooth 61 at its rib 37 and is engaged at the link end 75 by tooth 58 on the adjacent surface 55.

Figure 6:
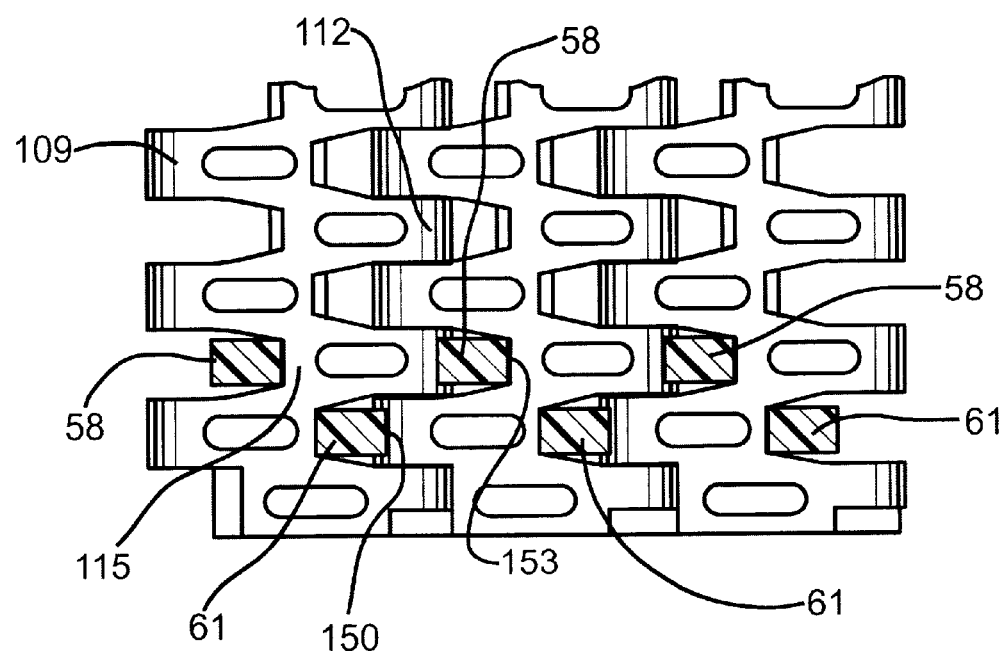

FIGS. 5–6 illustrate the drive sprocket 40 of the present invention in combination with a open grid or flush belt 100 comprised of flush grid modules 103 having openings for pivot rods 106. The flush or open grid modules 103 also have link ends 109 and 112 (located behind link ends 109 in FIG. 5) and have a transverse rib 115. The teeth 58, 61 of the drive sprocket 40 engage with the link ends 109, 112 and transverse rib 115 in the same manner as with the flat top belt modules 73.

Referring to FIG. 6 and with the belt 100 moving from left to right with respect to the orientation of the figure, the teeth 58, 61 of the drive sprocket 40 engage the belt 100 at points 150, 153 such that one tooth engages with the transverse rib 115 and a second tooth located on an adjacent surface 55 engages with one of the link ends 109, 112.

The belts 10, 70 and 100 and drive sprocket 40 of the present invention operate to increase the transmittable torque per sprocket because each belt module is engaged at two different points by two different teeth. Accordingly, the present invention provides for improved positive engagement because the belt modules 13 are each engaged at both the transverse rib and at the link ends in both moving directions.

The fit between the teeth and the belt modules provides for lower noise, lower risk of sprocket While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A drive sprocket for driving a modular belt having a plurality of belt modules with each belt module having opposed link ends and a rib disposed between the link ends transverse to a direction of belt travel, the drive sprocket, comprising:

a body having a plurality of teeth disposed around its perimeter, each of the teeth having a first center driving surface disposed on a first side and having a second link end driving surface disposed on a second side opposite the first side, the plurality of teeth disposed such that one of the first surfaces on a first tooth engages one of the ribs on a first belt module and one of the second surfaces on a second tooth engages one of the link ends on the first belt module, wherein the body has a plurality of sides, with each side having a pair of teeth disposed thereon, wherein the plurality of teeth are disposed in pairs such that one of the first surfaces on a first tooth in a first pair engages one of the ribs on a first belt module and one of the second surfaces on a second tooth in a second pair simultaneously engages one of the link ends on the first belt module.

2. A conveying apparatus, comprising:

a modular belt having a plurality of belt modules, each belt module having link ends disposed at opposite ends of the module and having a rib disposed between the link ends, the rib disposed transverse to a direction of belt travel, the link ends having an opening disposed transverse to the direction of belt travel, the link ends arranged such that the plurality of belt modules are capable of being intercalated by a plurality of pivot rods extending through the openings in the link ends;

a drive sprocket adapted to engage with the modular belt, the drive sprocket having a plurality of teeth disposed around its perimeter, each of the teeth having a first center driving surface disposed on a first side and having a second link end driving surface disposed on a second side opposite the first side, the plurality of teeth disposed such that one of the first surfaces on a first tooth engages one of the ribs on a first belt module and one of the second surfaces on a second tooth simultaneously engages one of the link ends on the first belt module; and, a rotating shaft attached to the drive sprocket.

3. The conveying apparatus of claim 2, wherein the sides of the drive sprocket are substantially flat.

4. The conveying apparatus of claim 2, wherein the center driving surface comprises an angled wall.

5. The conveying apparatus of claim 2, wherein the link end driving surface is curved to engage with the link ends.

6. The conveying apparatus of claim 2, wherein the teeth are disposed such that the modular belt can be driven either clockwise or counterclockwise.

7. The conveying apparatus of claim 2, wherein the drive sprocket has a central opening for mounting to the shaft.

8. The conveying apparatus of claim 7, wherein the central opening is square.

9. A conveying apparatus, comprising:

means for forming a modular belt comprising a plurality of belt modules;

means for engaging the modular belt such that each belt module is simultaneously engaged by a center driving surface and a link end driving surface on the engaging means; and, means for driving the engaging means.

10. A method of driving a modular belt having a plurality of belt modules with each belt module having opposed link ends and a rib disposed between the link ends and disposed transverse to a direction of belt travel, the method comprising:

providing a drive sprocket adapted to engage with the modular belt, the drive sprocket having a plurality of teeth disposed around its perimeter, each of the teeth having a first center driving surface disposed on a first side and having a second link end driving surface disposed on a second side opposite the first side, the plurality of teeth disposed such that one of the first surfaces on a first tooth engages one of the ribs on a first belt module and one of the second surfaces on a second tooth simultaneously engages one of the link ends on the first belt module;

providing a rotating shaft attached to the drive sprocket; and, engaging the drive sprocket with the modular belt such that each belt module is simultaneously driven by a first tooth in a first tooth pair and a second tooth in a second pair of teeth adjacent to the first pair.

* * * * *